United States Patent [19]

Markessini

[11] Patent Number: 4,761,184

[45] Date of Patent: Aug. 2, 1988

[54] FORMALDEHYDE BINDER

[75] Inventor: Efthalia V. Markessini, Karabournaki, Greece

[73] Assignee: Enigma N.V., Curacao, Netherlands Antilles

[21] Appl. No.: 13,163

[22] Filed: Feb. 11, 1987

Related U.S. Application Data

[63] Continuation of Ser. No. 764,669, Aug. 9, 1985, abandoned, which is a continuation-in-part of Ser. No. 575,881, Feb. 1, 1984, abandoned, which is a continuation-in-part of Ser. No. 515,342, Jul. 19, 1983, abandoned.

[30] Foreign Application Priority Data

Jan. 29, 1985 [GB] United Kingdom ............... 8502169

[51] Int. Cl.$^4$ ........................... C08K 5/05; C09J 3/14; C08L 97/02; C08G 12/12
[52] U.S. Cl. .................................... 106/203; 106/162; 156/326; 156/328; 156/336; 428/528; 527/305
[58] Field of Search ............... 106/162, 203; 156/336, 156/328; 252/182

[56] References Cited

U.S. PATENT DOCUMENTS

| 2,537,343 | 1/1951 | Golick et al. ...................... 156/310 |
| 3,624,243 | 11/1971 | Scott ..................................... 252/70 |
| 3,983,084 | 9/1976 | Alexander ........................... 260/17.2 |
| 4,192,923 | 3/1980 | Tajkawki ............................ 521/117 |
| 4,283,297 | 3/1976 | Peters .................................... 252/70 |
| 4,397,756 | 8/1983 | Lehmann ............................ 252/182 |

FOREIGN PATENT DOCUMENTS

| 1184332 | 3/1985 | Canada . |
| 0003163 | 7/1979 | European Pat. Off. . |
| 50-024413 | 3/1975 | Japan . |
| 1099088 | 1/1968 | United Kingdom . |
| 2136008 | 1/1968 | United Kingdom . |
| 1254786 | 11/1971 | United Kingdom . |
| 1272643 | 5/1972 | United Kingdom . |
| 1280961 | 7/1972 | United Kingdom . |
| 1326836 | 8/1973 | United Kingdom . |
| 1366256 | 9/1974 | United Kingdom . |
| 1374332 | 11/1974 | United Kingdom . |
| 1420017 | 1/1976 | United Kingdom . |
| 1427927 | 3/1976 | United Kingdom . |
| 1501534 | 2/1978 | United Kingdom . |

OTHER PUBLICATIONS

Chem Abstracts, 14 T 346 P, 1979.

Primary Examiner—A. Lionel Clingman
Attorney, Agent, or Firm—Wenderoth, Lind & Ponack

[57] ABSTRACT

A formaldehyde binder containing at least one organic hydroxy compound, at least one amide, and water. This binder is suitable for use in preparing boards from lignocellulosic materials using adhesive based on formaldehyde.

15 Claims, No Drawings

FORMALDEHYDE BINDER

This is a continuation of co-pending application Ser. No. 764,669 filed on Aug. 9, 1985, abandoned, which is a continuation-in-part of application Ser. No. 575,881 filed on Feb. 1, 1984 (now abandoned), which is a continuation-in-part of application Ser. No. 515,342 filed on Jul. 19, 1983 (now abandoned).

Boards such as particleboard, chipboard, plywood, blockboard and the like, are prepared from lignocellulosic materials using adhesives. The preferred adhesives (or glues) are based on formaldehyde, such as urea-formaldehyde, melamine-formaldehyde, phenol-formaldehyde and resorcinol-formaldehyde resins or mixtures thereof. It is a well-known fact that boards prepared using these adhesives have a formaldehyde odor which is both harmful and unpleasant. Formaldehyde is emitted both during the production of such boards and during their storage and final use.

Many methods of avoiding the emission of formaldehyde have been proposed, but all of them are either ineffective or reduce the properties of the boards or require complicated application procedures. Some of these procedures known already for more than ten years involve sprayig or spread coating the warm boards coming out of the press with various solutions, such as solutions of urea and/or ammonia or of ammonium salts. Generally, these types of methods are not desirable for industrial application because they require additional process steps and are of limited efficiency in the long run. One such method is indicated in Japanese Pat. No. 50/024413 (1975). In this reference the formaldehyde collector is coated in a veneer and then dried and pressed. It is not mixed in the glue formulation. It is thus used over and above the quantity of glue normally used. The glue formulation in this particular case contains flour and ammonium chloride; flour is added to increase the viscosity of the mixture so as to reduce glue penetration in the veneer and to reduce cost. Ammonium chloride is added as a hardener for the polycondensation of the resin in the press. These elements are not added as formaldehyde binders. U.S. Pat. No. 4,397,756 provides a formaldehyde binder composition of starch and urea which can be sprayed onto the wood chips, but cannot be used to substitute part of the resin used for bonding the cellulosic particles, as can the composition of the instant invention.

Other methods involve the use of very complicated mixtures of a large number of components, some of which are natural glues. These products also are not very efficient. One drawback thereof is the fact that the properties of natural products are not constant.

Another way of reducing the content of free formaldehyde involves the use of an aqueous suspension of urea prills coated with a special wax. This method, too, requires a separate feeding line because the product is not added to the adhesive formulation itself.

The invention relates to an efficient formaldehyde binder for reducing the free formaldehyde in boards and in the hall of production, more particularly to a formaldehyde binder when for use in boards prepared from lignocellulosic materials using adhesives based on formaldehyde, which comprises a solution in water of (a) at least one organic hydroxy compound selected from dihydric, trihydric and pentahydric alcohols containing up to 20 carbon atoms, monosaccharides containing up to 6 carbon atoms, disaccharides containing up to 12 carbon atoms and mixtures thereof, and (b) at least one amide.

This formaldehyde binder can, in addition, contain (c) an organic compound which acts as a solvent for (a) and (b) and also reacts with formaldehyde and/or (d) an inorganic compound soluble in water.

The organic compound (c) is preferably a $C_{1-4}$ aliphatic monohydric alcohol, while the inorganic compound (d) is preferably a water-soluble halide salt.

The above-mentioned formaldehyde binder effectively reduces the free formaldehyde in boards without reducing the properties of the board, without changing the reactivity of the adhesive formulations and without requiring any additional steps in the production of particleboard, plywood or blockboard, while reducing simultaneously the free formaldehyde in the production hall.

The above-mentioned formaldehyde binder is very efficient when used with glues that contain a high amount of formaldehyde as compared with the other ingredients such as urea, melamine, phenol or resorcinol, ginving thus more than 50 mg of free formaldehyde per 100 g of dry board. The reduction in this case is up to 60 to 85% of the free formaldehyde. In this case of resins having a low formaldehyde content where the emission of free formaldehyde is between 20 and 50 mg of free formaldehyde per 100 g. of dry board, the maxiium reduction is usually 50 to 60%. No figures are reported for resins having a low formaldehyde content and giving less than 20 mg of free formaldehyde per 100 g of dry board.

The last years there has been a significant development in the field of resins giving a low emission of free formaldehyde.

It is a further object of the present invention to provide a formaldehyde binder that, apart from having all the above-mentioned advantages of the formaldehyde binder containing components (a) and (b) and optionally (c) and (d), is extremely efficient also in case of very low emissions of free formaldehyde.

A new formaldehyde binder has therefore been developed which when used with resins giving less than 20 mg of free formaldehyde per 100 g of dry board completely eliminates the free formaldehyde emitted by the resins (the boards still emit some free formaldehyde, but this is emitted by the wood itself).

In the case of resins giving more than 20 mg of free formaldehyde per 100 g of dry board, the formaldehyde binder of the inventioneliminates up to 60 to 85% of the free formaldehyde.

This preferred formaldehyde binder of the invention contains components (a) and (b) and can also contain optional components (c) and/or (d). In addition, the preferred formaldehyde binder of the invention contains (e) ammonia and/or ammonium salt of a weak acid or a mixture thereof and (f) a strong acid and/or an agent releasing a strong acid or a mixture thereof.

The amount of ammonia and/or ammonium salt of a weak acid or mixtures thereof is 0.01 to 5.00% by weight, preferably 0.03 to 3.00% by weight (calculated as 100% product), based ont the total fromaldehyde binder, and the amount of strong acid and/or agent releasing a strong acid or mixtures thereof is likewise 0.01 to 5.00% by weight, preferably 0.03 to 3.00% by weight (calculated as 100% product), based on the total formaldehyde binder.

Preferably the organic hydroxy compounds [component (a)] are soluble in water or in lower monohydric aliphatic alcohols. The organic hydroxy compounds are selected from the dihydric, trihydric and pentahydric alcohols containing up to 20 carbon atoms, the monosaccharides containing up to 6 carbon atoms, the disaccharides containing up to 12 carbon atoms, corn syrup and others. The above mentioned products are used alone or in mixtures thereof.

Specific examples of suitable organic hydroxy compounds are monoethyleneglycol, diethyleneglycol, polethyleneglycols, glycerine, pentaerythritol, fructose, mannose, sorbitol, dextrose, sucrose, maltose, lactose, corn syrup and the like.

Preferably the amides [component (b)] used in the formaldehyde binder of the invention are likewise soluble in water or in lower monohydric aliphatic alcohols. Particularly preferred are the aliphatic amides containing up to 6 carbon atoms and the aromatic amides containing one benzene ring.

Suitable examples of amides are urea, thiourea, formamide, acetamide, benzamide, oxamide, succinamide, malonamide, guanidine, biuret, dicyandiamide and the like.

If desired, to enhance solubility, the formaldehyde binder of the invention can additionally contain additives [component (c)] which are lower monohydric aliphatic alcohols such as methanol, ethanol, isopropanol and the like.

A cheaper and more efficient formaldehyde binder is obtained if inorganic compounds [component (d)] which are preferably halide salts, more preferably halides of alkali metals or alkaline earth metals, such as sodium chloride, potassium chloride and calcium chloride, are added.

Examples of ammonium salts of weak acids [component (e) ] which may be present in the formaldehyde binder of the invention are ammonium carbonate, ammonium bicarbonate, ammonium sulfamate, ammonium acetate, ammonium carbonate and others.

Examples of strong acids and/or agents releasing a strong acid [component (f)] which may be present in the formaldehyde binder of the invention are hydrochloric acid or ammonium chloride, sulfuric acid or ammonium sulfate, formic acid or ammonium formate and others.

The ratio of organic hydroxy compound [component (a) and component (c), if present] and inorganic compound [component (d), if present] to amide [component (b)] is preferably 20:100 to 400:100, particularly 20:100 to 200:100, by weight. The formaldehyde binder of the invention can be added to the usual glue formulations in quantities varying from 1 to 10%, preferably 3 to 7%, of formaldehyde binder solids, based on the weight of the liquid resin containing 65% by weight of resin solids.

The formaldehyde binder of the invention may contain 20 to 85% by weight, preferably 50 to 75% by weight, of the active ingredients [components (a) and (b) and components (c) and/or (d), if present, as well as components (e) and (f), if present]. The water content of the formaldehyde binder depends on the solubility of the active ingredients and the amount of water which can be tolerated in the glue formulations. Even if the individual components are not soluble in water, they may be dissolved in water by heating a mixture thereof in water to 70° C.

The formaldehyde binder of the invention can be produced by simply adding the active ingredients and water to a mixer and mixing until the active ingredients are dissolved. This can be done at room temperature or at an elevated temperature up to 70° C.

When the active ingredients of the formaldehyde binder of the invention are used in combination with each other, the free formaldehyde reduction is surprisingly much higher than the sum of the effects of the separate ingredients, and they have no adverse effect on the reactivity of the glue formulation and on the properties of the boards. This is clearly shown in Example 12 and the accompanying tables.

It is well known in the art that ammonia reacts with formaldehyde thus reducing significantly the free formaldehyde of the resulting boards. However, it is also known in the art that it is nto possible to add ammonia to the glue mixture in such quantities that it will significantly reduce the free formaldehyde, because it reduces simultaneously also the properties of the resulting boards while requiring longer press times. This occurs because on the one hand the reactivity is slowed down significantly and also because the free formaldehyde available is bound chemically thus reducing even further the amount of resin cure that can be reached under similar conditions. That is why for a number of years ammonia was added after the boards are removed from the press thus requiring time consuming processes and expensive and complicated installations which had also the significant drawback of not reducing the free formaldehyde in the hall of production.

It was indeed surprising to find out that by adding ammonia and/or ammonium salts of weak acids or mixtures thereof in the form of the formaldehyde binder of the invention [that is, in combination with a strong acid and/or an agent releasing a strong acid or mixtures thereof and components (a) and (b) as well as, optionally, components (c) and/or (d)] to the glue mixture itself, boards are produced which have a reduced emission of free formaldehyde, even when there are used glues having a low formaldehyde content and giving boards emitting less than 20 mg of free formaldehyde per 100 g of dry board, and that the properties of the boards are not reduced, the reactivity of the glue formulations is not changed and no additional steps are required in the production of the boards, while the free formaldehyde in the hall of production is simultaneously reduced to a larger extent than with the formaldehyde binder not containing components (e) and (f). This last advantage is very important for the health of the workers who work in factories producing boards.

The formaldehyde binder according to the present invention is not added to the glue formulation in addition to all the other conventional ingredients thereof, but it substitutes a part of the resin serving as glue. Thereby, the formaldehyde binder of the invention is very economical. It may be used with all types of glues based on formaldehyde and even with the special E 1 type resins (resins which give around 10 mg of free formaldehyde per 100 g of dry board), in which latter case it further reduces the free formaldehyde to around 5 mg per 100 g of dry board (which is the amount of formaldehyde emitted by the wood itself).

The following examples illustrate the invention which is, of course, not restricted to the values reported in the examples. Parts and percents are by weight.

EXAMPLE 1

In this example the organic compound containing hydroxyl groups is glycerine and the amide is urea. Here, there is illustrated the synergistic behaviour of these two compounds. Various glue formulations are prepared and each is used subsequently in order to produce particleboard.

The control does not include any of the components of the formaldehyde binder according to the invention. Sample 1 includes both glycerine and urea, sample 2 includes only glycerine and sample 3 includes only urea.

It is noticed from the tables reported here below that glycerine when used on its own (sample 2) is a very efficient formaldehyde binder, but urea (sample 3) gives a poorer formaldehyde reduction and lower mechanical values and water resistance, however, when urea is used in combination with glycerine (sample 1), it gives values that are equivalent to those of glycerine on its own.

We may therefore use a cheaper and less efficient product (urea) and make it react as effectively as a more expensive and more efficient product (glycerine). The efficiency refers to formaldehyde absorbing capacities as well as to maintaining good mechanical properties and water resistance without changing the reactivity of the glue formulation and without the need to introduce any special apparatus for its use.

Formaldehyde reduction actually is in this case 46%.

The formulations of the various samples used are as follows:

|  | 1 parts by weight | 2 parts by weight | 3 parts by weight |
| --- | --- | --- | --- |
| Glycerine (100%) | 270 | 590 | — |
| Urea (100%) | 320 | — | 590 |
| Water | 410 | 410 | 410 |
|  | 1000 | 1000 | 1000 |
| % solids | 59 | 59 | 59 |

The glue formulations used are as follows:

|  | Control grams | 1 grams | 2 grams | 3 grams |
| --- | --- | --- | --- | --- |
| Urea-formaldehyde resin 65% (Molar ratio F:U 1.27:1) | 3077 | 3077 | 3077 | 3077 |
| Hardener (Ammonium chloride 15%) | 400 | 400 | 400 | 400 |
| Paraffin emulsion 50% | 250 | 250 | 250 | 250 |
| Ammonia 25° Baume | 5 | 5 | 5 | 5 |
| Sample 1 | — | 308 | — | — |
| Sample 2 | — | — | 308 | — |
| Sample 3 | — | — | — | 308 |
| Water | 268 | — | — | — |
| Total | 4000 | 4040 | 4040 | 4040 |
| Gel time in secs. | 68 | 68 | 71 | 62 |

Single-layer boards are prepared in the laboratory by spraying each of these formulations onto 25 kgs wood chips. Boards are pressed at 10, and 9 and 8 secs./mm. The thickness of the boards is 17.3 mms. The temperature of the press is 200° C. and the pressure is 35 kg/cm². The dimensions of the boards produced are 40×56 cms.

The results obtained are reported in the following table and are average values.

|  | Control | 1 | 2 | 3 |
| --- | --- | --- | --- | --- |
| Density (kg/m³) | 683 | 669 | 663 | 657 |
| Bending strength (N/mm²) | 19.9 | 18.1 | 17.3 | 16.3 |
| Tensile strength (N/mm²) | 0.73 | 0.72 | 0.71 | 0.63 |
| 2 hr. thickness swelling (%) | 5.2 | 4.9 | 4.5 | 5.4 |
| 24 hr. thickness swelling (%) | 51.4 | 49.9 | 47.4 | 53.1 |
| Free formaldehyde (mg/100 g dry board) | 15.8 | 8.5 | 8.7 | 11.7 |

EXAMPLE 2

This is another example illustrating the synergistic behaviour of glycerine and urea in reducing the free formaldehyde of particleboards while maintaining the mechanical properties of the boards and the water resistance as well.

The control does not include any of the components of the formaldehyde binder according to the invention. Sample 1 contains both components of the formaldehyde binder according to the invention and sample 2 contains only one of the two components (the most efficient of the two components).

It is noticed here again that only sample 1 gives free formaldehyde that is below 10 mg/100 g. dry board (which is the desired level for E 1 class) and is the only one to have absolutely equivalent mechanical properties and water resistance. Formaldehyde reduction actually is 34%.

The formulations of the various samples used are as follows:

|  | 1 parts by weight | 2 parts by weight |
| --- | --- | --- |
| Glycerine (100%) | 128 | 128 |
| Urea (100%) | 424 | — |
| Water | 448 | 872 |
|  | 1000 | 1000 |
| % solids | 55.2 | 12.8 |

The glue formulations used are as follows:

|  | Control grams | 1 grams | 2 grams |
| --- | --- | --- | --- |
| Urea formaldehyde resin 65% (Molar ratio F:U = 1.27:1) | 3077 | 3077 | 3077 |
| Hardener (Ammonium chloride 15%) | 400 | 400 | 400 |
| Paraffin emulsion 50% | 250 | 250 | 250 |
| Ammonia 25° Baume | 5 | 5 | 5 |
| Sample 1 | — | 268 | — |
| Sample 2 | — | — | 268 |
| Water | 268 | — | — |
| Total | 4000 | 4000 | 4000 |
| Gel time in secs. | 66 | 67 | 69 |

Single-layer boards are prepared in the laboratory by spraying each of these formulations onto 25 kgs wood chips. Boards are pressed at 10, 9 and 8 secs./mm. The thickness of the boards is 17.5 mms. The temperature of the press is 200° C. and the pressure is 35 kg/cm². The dimensions of the boards produced are 40×56 cms.

The results obtained are reported in the following table and are average values.

|  | Control | 1 | 2 |
|---|---|---|---|
| Density (kg/m$^3$) | 685 | 684 | 687 |
| Bending strength (N/mm$^2$) | 20.7 | 20.6 | 19.4 |
| Tensile strength (N/mm$^2$) | 0.74 | 0.73 | 0.67 |
| 2 hr. thickness swelling (%) | 11.0 | 7.9 | 8.6 |
| 24 hr. absorption (%) | 23.5 | 23.2 | 23.7 |
| Free formaldehyde (mg/100 g dry board) | 14.3 | 9.5 | 12.3 |

EXAMPLE 3

This example illustrates the efficiency of monoethyleneglycol together with urea as a formaldehyde binder.

Two formulations are prepared: the control without any of the ingredients of the formaldehyde binder according to the invention and sample 1 which includes both monoethyleneglycol and urea.

Boards are produced from these two glue formulations and it is proved here, too, that with the formaldehyde binder according to our invention we obtain with a urea-formaldehyde resin that gives normally boards classified as E 2 (control), boards classified as E 1 (sample 1).

|  | Sample 1 parts by weight |
|---|---|
| Monoethyleneglycol 100% | 360 |
| Urea 100% | 365 |
| Water | 275 |
|  | 1000 |
| % solids | 72.5 |

The glue formulations used are as follows:

|  | Control grams | 1 grams |
|---|---|---|
| Urea formaldehyde resin 65% (Molar ratio F:U = 1.27:1) | 3077 | 3077 |
| Hardener (Ammonium chloride 15%) | 400 | 400 |
| Paraffin emulsion 50% | 250 | 250 |
| Ammonia 25° Baume | 5 | 5 |
| Sample 1 | — | 268 |
| Water | 268 | — |
| Total | 4000 | 4000 |
| Gel time in secs. | 66 | 60 |

Single-layer boards are prepared in the laboratory by spraying each of these formulations onto 25 kgs wood chips. Boards are pressed at 10, 9 and 8 secs./mm. The thickness of the boards is 17.3 mms. The temperature of the press is 200° C. and the pressure is 35 kg/cm$^2$. The dimensions of the boards produced are 40×56 mms.

The results obtained are reported in the following table and are average values.

|  | Control | 1 |
|---|---|---|
| Density (kg/m$^3$) | 685 | 684 |
| Bending strength (N/mm$^2$) | 20.7 | 20.2 |
| Tensile strength (N/mm$^2$) | 0.74 | 0.74 |
| 2 hr. thickness swelling (%) | 11.0 | 8.6 |
| 24 hr. absorption (%) | 23.5 | 22.6 |
| Free formaldehyde (mg/100 g dry board) | 14.3 | 9.0 |

EXAMPLE 4

In this example we are illustrating the synergistic behaviour of monoethyleneglycol and urea.

Boards are prepared from three different formulations: the control wherein no ingredients of the formaldehyde binder according to the invention are used, sample 1 wherein both ingredients of the formaldehyde binder of the present invention are used and sample 2 wherein only one ingredient is used.

It is obvious from the results obtained and reported here in below that sample 1 containing both ingredients is much more effective than sample 2 containing only one ingredient (the most efficient of the two ingredients).

The formaldehyde reduction obtained in this case is 32%.

The formulations of the various samples used are as follows:

|  | 1 parts by weight | 2 parts by weight |
|---|---|---|
| Monoethyleneglycol 100% | 230 | 580 |
| Urea 100% | 350 | — |
| Water | 420 | 420 |
|  | 1000 | 1000 |
| % solids | 58 | 58 | the glue formulations are as follows:

|  | Control grams | 1 grams | 2 grams |
|---|---|---|---|
| Urea formaldehyde resin 65% (Molar ratio F:U = 1.27:1) | 3077 | 3077 | 3077 |
| Hardener (Ammonium chloride 15%) | 400 | 400 | 400 |
| Paraffin emulsion 50% | 250 | 250 | 250 |
| Ammonia 25° Baume | 5 | 5 | 5 |
| Sample 1 | — | 268 | — |
| Sample 2 | — | — | 268 |
| Water | 268 | — | — |
| Total | 4000 | 4000 | 4000 |
| Gel time in secs. | 70 | 71 | 76 |

Single-layer boards are prepared in the laboratory by spraying each of these formulations onto 25 kgs wood chips. Boards are pressed at 10, 9 and 8 secs./mm. The thickness of the boards is 17.3 mms. The temperature of the press is 200° C. and the pressure is 35 kg/cm$^2$. The dimensions of the boards produced are 40×56 mms.

The results obtained are reported in the following tables and are average values.

|  | Control | 1 | 2 |
|---|---|---|---|
| Density (kg/m$^3$) | 688 | 688 | 687 |
| Bending strength (N/mm$^2$) | 17.6 | 17.6 | 17.5 |
| Tensile strength (N/mm$^2$) | 0.55 | 0.60 | 0.56 |
| 2 hr. thickness swelling (%) | 6.7 | 4.9 | 4.7 |
| 24 hr. absorption (%) | 20.1 | 20.1 | 19.5 |
| Free formaldehyde (mg/100 g dry board) | 15.0 | 10.3 | 12.3 |

EXAMPLE 5

In this example the use of a resin of different molar ratio is illustrated as well as various levels of addition of the formaldehyde binder itself.

The formaldehyde binder used has the following formulations:

|  | parts by weight |
|---|---|
| Glycerine 100% | 270 |
| Urea 100% | 318 |
| Water | 412 |
|  | 1000 |
| % solids | 58.8 |

The glue formulations used in the various samples are as follows:

|  | Control grams | 1 grams | 2 grams | 3 grams |
|---|---|---|---|---|
| Urea formaldehyde resin 65% (Molar ratio F:U = 1.4:1) | 3077 | 3077 | 3077 | 3077 |
| Hardener (Ammonium chloride 15%) | 293 | 380 | 380 | 380 |
| Paraffin emulsion 50% | 250 | 250 | 250 | 250 |
| Ammonia 25° Baume | 5 | 5 | 5 | 5 |
| Formaldehyde binder | — | 154 | 215 | 375 |
| Water | 375 | 134 | 73 | — |
| Total | 4000 | 4000 | 4000 | 4087 |
| Gel time in secs. | 73 | 73 | 72 | 75 |

Single-layer boards are prepared in the laboratory by spraying each of these formulations onto 25 kgs wood chips. Boards are pressed at 10, 9 and 8 secs./mm. The thickness of the boards is 17.3 mms. The temperature of the press is 200° C. and the pressure is 35 kg/cm$^2$. The dimensions of the boards produced are 40×56 cms.

The results obtained are reported in the following table and are average values.

|  | Control | 1 | 2 | 3 |
|---|---|---|---|---|
| Density (kg/m$^3$) | 680 | 687 | 685 | 688 |
| Bending strength (N/mm$^2$) | 22.0 | 22.5 | 22.3 | 21.6 |
| Tensile strength (N/mm$^2$) | 0.61 | 0.63 | 0.66 | 0.64 |
| 2 hr. thickness swelling (%) | 10.1 | 9.3 | 8.8 | 9.5 |
| 24 hr. thickness swelling (%) | 20.6 | 21.8 | 21.0 | 21.5 |
| Free formaldehyde (mg/100 g dry board) | 22.2 | 13.0 | 10.1 | 9.5 |

It is noticed that the mechanical properties and water resistance of the boards are equivalent and the formaldehyde reduction is 41% in case of sample 1, 55% in case of sample 2 and 57% in case of sample 3.

EXAMPLE 6

In this example five different types of poly-alcohols are illustrated, two different types of amides, one additive and a variation in the ratio of alcohol to amide covering a range of 57.5/100 to 385/100.

The various types of formaldehyde binder used are as follows:

|  | 1 | 2 | 3 | 4 | 5 | 6 |
|---|---|---|---|---|---|---|
| Dextrose | 230 | — | — | — | — | — |
| Diethyleneglycol | — | 330 | — | — | — | — |
| Monoethyleneglycol | — | — | 260 | — | — | 110 |
| Glycerine | — | — | — | 500 | — | — |
| Sucrose | — | — | — | — | — | 110 |
| Sorbitol | — | — | — | — | 140 | — |
| Methanol | — | — | 200 | — | 140 | 80 |
| Urea | 400 | 300 | — | 130 | 350 | 330 |
| Thiourea | — | — | 170 | — | — | — |
| Water | 370 | 370 | 370 | 370 | 370 | 370 |
| Total | 1000 | 1000 | 1000 | 1000 | 1000 | 1000 |
| % solids | 63 | 63 | 63 | 63 | 63 | 63 |
| Weight ratio of alcohol/amide | 57.5/100 | 110/100 | 270/100 | 385/100 | 80/100 | 91/100 |

All above-mentioned figures are in parts by weight.
The glue formulations used in the various samples are as follows:

|  | Control grams | 1 grams | 2 grams | 3 grams | 4 grams | 5 grams | 6 grams |
|---|---|---|---|---|---|---|---|
| Urea-formaldehyde resin 65% (Molar ratio F:U = 1.27:1) | 3077 | 3077 | 3077 | 3077 | 3077 | 3077 | 3077 |
| Hardener (Ammonium chloride 15% solution) | 400 | 500 | 500 | 500 | 500 | 500 | 500 |
| Paraffin emulsion 50% | 250 | 250 | 250 | 250 | 250 | 250 | 250 |
| Ammonia 25° Baume | 5 | — | — | — | — | — | — |
| Formaldehyde binder |  |  |  |  |  |  |  |
| Sample 1 | — | 307 | — | — | — | — | — |
| Sample 2 | — | — | 307 | — | — | — | — |
| Sample 3 | — | — | — | 307 | — | — | — |
| Sample 4 | — | — | — | — | 307 | — | — |
| Sample 5 | — | — | — | — | — | 307 | — |
| Sample 6 | — | — | — | — | — | — | 307 |
| Water | 268 | — | — | — | — | — | — |
| Total | 4000 | 4134 | 4134 | 4134 | 4134 | 4134 | 4134 |
| Gel time in secs. | 65 | 66 | 65 | 67 | 66 | 62 | 69 |

Single-layer boards are prepared in the laboratory by spraying each of these formulations onto 25 kgs wood chips. Boards are pressed at 10, 9 and 8 secs./mm. The thickness of the boards is 17.3 mms. The temperature of the press is 200° C. and the pressure is 35 kg/cm². The dimensions of the boards produced are 40×56 cms.

The results obtained are reported in the following table and are average values.

|  | Control | 1 | 2 | 3 | 4 | 5 | 6 |
|---|---|---|---|---|---|---|---|
| Density (kg/m³) | 688 | 689 | 687 | 685 | 690 | 685 | 692 |
| Bending strength (N/mm²) | 19.6 | 19.5 | 18.3 | 19.5 | 20.1 | 19.3 | 19.4 |
| Tensile strength (N/mm²) | 0.71 | 0.69 | 0.67 | 0.73 | 0.74 | 0.72 | 0.70 |
| 2 hr. thickness swelling (%) | 7.0 | 6.5 | 5.0 | 5.5 | 6.1 | 6.5 | 6.2 |
| 24 hr. thickness swelling (%) | 19.7 | 19.3 | 20.0 | 19.8 | 19.5 | 20.1 | 19.9 |
| Free formaldehyde (mg/100 g dry board) | 16.1 | 8.9 | 8.6 | 11.0 | 9.0 | 9.8 | 8.5 |
| Formaldehyde reduction % | — | 45 | 47 | 32 | 44 | 39 | 47 |

The above-mentioned results prove that all samples used have values equivalent to the control and that the formaldehyde reduction is of the order of 32 to 47%.

EXAMPLE 7

In this example one type of formaldehyde binder is used and the resin is based on phenol-malemine-urea formaldehyde resin.

The formaldehyde binder used has the following formulation:

|  | parts by weight |
|---|---|
| Monoethyleneglycol | 300 |
| Urea | 330 |
| Water | 370 |
|  | 1000 |

The glue formulations used are as follows:

|  | Control grams | I grams |
|---|---|---|
| Phenol-melamine-urea-formaldehyde resin 63% | 5600 | 5600 |
| Hardener (solution in water of 15.5% ammonium chloride) | 840 | 840 |
| Paraffin emulsion 50% | 150 | 150 |
| Formaldehyde binder | — | 560 |
| Total | 6590 | 7150 |
| Gel time in secs. | 73 | 79 |

Single-layer boards are prepared in the laboratory by spraying each of these formulations onto 25 kgs wood chips. Boards are pressed at 10, 9 and 8 secs./mm. The thickness of the boards is 17.3 mms. The temperature of the press is 200° C. and the pressure is 35 kg/cm³. The dimensions of the boards produced are 40×56 cms.

The results obtained are reported in the following table and are average values.

|  | Control | 1 |
|---|---|---|
| Density (kg/m³) | 705 | 695 |
| Bending strength (N/mm²) | 26.2 | 25.9 |
| Tensile strength (N/mm²) | 0.27 | 0.26 |
| Tensile strength V100 (N/mm²) | 2.7 | 2.6 |
| 2 hr. thickness swelling (%) | 7.1 | 6.2 |
| 24 hr. thickness swelling (%) | 12.0 | 11.3 |
| Free formaldehyde (mg/100 g dry board) | 12.8 | 7 |
| Formaldehyd reduction (%) | — | 45 |

The above-mentioned results prove that the formaldehyde binder according to the present invention can be used also for phenol-melamine-urea-formaldehyde resins reducing considerably the free formaldehyde emission without adversely affecting the properties of the boards.

EXAMPLE 8

In this example the formaldehyde binder used includes an inorganic component [component (d)], illustrated in this case by sodium chloride.

The formaldehyde binder used has the following formulation:

|  | Parts by weight |
|---|---|
| Monoethyleneglycol 100% | 270 |
| Urea 100% | 318 |
| Sodium chloride 100% | 50 |
| Water | 362 |
| Total | 1000 |
| % solids | 63.8 |

The glue formulations used in the various samples are as follows:

|  | Control grams | 1 grams |
|---|---|---|
| Urea-formaldehyde resin (Molar ratio F:U = 1.27:1) | 3077 | 2770 |
| Hardener (Ammonium chloride 15% solution) | 400 | 450 |
| Paraffin emulsion 50% | 250 | 250 |
| Ammonia 25° Baume | 5 | — |
| Formaldehyde binder | — | 307 |
| Water | 268 | — |
| Total | 4000 | 3777 |
| Gel time in secs. | 65 | 64 |

Single-layer boards are prepared in the laboratory by spraying each of these formulations onto 25 kg wood chips. Boards are pressed at 10, 9 and 8 secs/mm. The thickness of the boards is 17.3 mms. The temperature of the press is 200° C. and the pressure is 35 kg/cm². The dimensions of the boards pressed are 40×56 cms.

The results obtained are reported in the following table and are average values.

|  | Control | 1 |
|---|---|---|
| Density (kg/m³) | 695 | 699 |
| Bending strength (N/mm²) | 19.9 | 19.5 |
| Tensile strength (N/mm²) | 0.71 | 0.73 |
| 2 hr. thickness swelling (%) | 7.0 | 6.6 |
| 24 hr. thickness swelling (%) | 20.5 | 20.8 |
| Free formaldehyde (mg/100 g dry board) | 17 | 9.5 |
| Formaldehyde reduction (%) | — | 44 |

The results prove that the sample including the formaldehyde binder gives values that are equivalent to the control sample in spite of the fact that the formaldehyde binder substitutes a part of the urea-formaldehyde resin in the formulation. The formaldehyde reduction is 44%.

EXAMPLE 9

In this example, boards were prepared in the laboratory.

Four series of boards were prepared. The first one which was prepared with a glue formulation containing no formaldehyde binder is the blank. The second one was prepared using a formaldehyde binder of the invention containing components (a) and (b) (formulation 1) without the addition of ammonium and/or ammonium salts of weak acids in combination with a strong acid and/or an agent releasing a strong acid. The third and fourth series were prepared using preferred formaldehyde binders according to the present invention also containing components (e) and (f) (formulations 2 and 3). It can be seen that the reduction of the free formaldehyde is much greater with formulations 2 and 3 than with formuation 1.

The formulations of the formaldehyde binders were as follows (given in parts by weight with all ingredients calculated as 100% solids):

|  | 1 | 2 | 3 |
|---|---|---|---|
| Glycerine | 200 | 200 | 200 |
| Urea | 250 | 250 | 250 |
| Sodium chloride | 100 | 100 | 100 |
| Ammonia | — | 1.65 | 1.98 |
| Ammonium chloride | — | 5 | 6 |
| Water | 450 | 443.35 | 442.02 |
| TOTAL | 1,000 | 1,000 | 1,000 |

The glue formulations used were as follows (given in parts by weight):

|  | Blank | 1 | 2 | 3 |
|---|---|---|---|---|
| Urea formaldehyde resin 65% (Molar ratio F:U = 1.27:1) | 3080 | 2864 | 2864 | 2864 |
| Hardener (Ammonium chloride 15%) | 400 | 400 | 400 | 400 |
| Paraffin emulsion 50% | 210 | 210 | 210 | 210 |
| Formaldehyde binder 1 | — | 216 | — | — |
| Formaldehyde binder 2 | — | — | 216 | — |
| Formaldehyde binder 3 | — | — | — | 216 |
| Water | 310 | 310 | 310 | 310 |

Single layer boards were prepared in the laboratory by spraying each of these formulations onto 25 kg of wood chips. Boards were pressed at 10, 9 and 8 sec./mm. The thickness of the boards was 17.3 mm. The temperature of the press was 200° C. and the pressure was 35 kg/cm$^2$. The dimensions of the boards produced were 40×56 cm.

The results obtained are reported in the following table and are average values of the respective properties.

|  | Blank | 1 | 2 | 3 |
|---|---|---|---|---|
| Density (kg/m$^3$) | 702 | 705 | 700 | 705 |
| Bending strength (N/mm$^2$) | 20.0 | 19.5 | 19.3 | 19.5 |
| Internal bond strength (N/mm$^2$) | 0.69 | 0.65 | 0.63 | 0.60 |
| 2 hrs thickness swelling (%) | 7.1 | 7.2 | 7.5 | 8.0 |
| 24 hrs thickness swelling (%) | 20.9 | 21.3 | 22.8 | 23.5 |
| Free formaldehyde (mg/100 g of dry board) | 14.4 | 8.0 | 6.4 | 4.0 |
| % formaldehyde reduction | — | 44.4 | 55.6 | 72.2 |

The reported results show that even though the urea formaldehyde resin used gives boards having a low free formaldehyde value, i.e. a value below 20 mg per 100 g of dry board (the actual value is 14.4 mg per 100 g of dry board), the reduction obtained with the preferred formaldehyde binder of the invention containing components (e) and (f) is much higher (up to 72.2%) than that obtained with the formaldehyde binder not containing components (a) and (f) which is 44.4%.

EXAMPLE 10

In this example the boards were prepared industrially in a Bison mono-etage type of plant. A 3-layer type of board was produced; that is why two different glue formulations were prepared for each board, the Core and Surface formulations.

Two series of boards were prepared. The first one was prepared with glue formulations containing no formaldehyde binder (Blank); the second one was prepared using a formaldehyde binder of the invention containing components (e) and (f) (Sample 1).

The formulation of the formaldehyde binder used was as follows:

| Ethylene glycol | 200 |
|---|---|
| Urea | 260 |
| Methanol | 50 |
| Sodium chloride | 50 |
| Ammonium bicarbonate | 7.6 |
| Ammonium chloride | 6 |
| Water | 426.4 |

All above-mentioned chemicals are calculated as 100% solids and amounts are given in parts by weight.

The glue formulations used were as follows:

|  | Blank | | Sample 1 | |
|---|---|---|---|---|
|  | Core kg | Surface kg | Core kg | Surface kg |
| Urea formaldehyde resin 65% (Molar ratio F:U = 1.15:1) | 338 | 383 | 314 | 356 |
| Hardener (Ammonium chloride 15%) | 50 | 5 | 50 | 5 |
| Paraffin emulsion | 15 | 10 | 15 | 10 |
| Formaldehyde binder | — | — | 24 | 27 |
| Water | 17 | 102 | 17 | 102 |
| Total | 420 | 500 | 420 | 500 |

Three-layer boards were prepared industrially by spraying the core formulation on 275 kg of wood chips and the surface formulation on 200 kg of wood fines. Boards were pressed at 7.5 sec/mm. The thickness of the boards was 17 mm. The temperature of the press was 200° C. and the pressure 35 kg/cm$^2$.

The results obtained are reported in the following table. The boards were tested after sanding.

|  | Blank | Sample 1 |
|---|---|---|
| Density (kg/m$^3$) | 675 | 688 |
| Bending strength (N/mm$^2$) | 16.1 | 15.8 |
| Internal bond strength (N/mm$^2$) | 0.76 | 0.78 |
| 2 hrs thickness swelling (%) | 7.0 | 7.7 |
| Free formaldehyde (mg/100 g of dry board) | 6.6 | 3.0 |
| % formaldehyde reduction | — | 54.5 |

The free formaldehyde was reduced in Sample 1 to such extent that the resin itself does no longer emit any formaldehyde. The formaldehyde emission is as low as 3.0 mm per 100 g of dry board; such amounts are emitted by the wood itself.

EXAMPLE 11

In this example, boards were prepared in the laboratory.

Two series of boards were prepared. The first one was the blank and was produced with a glue formulation contaiing no formaldehyde binder. The second series was prepared using the following formaldehyde binder of the invention:

|  | Parts of weight |
|---|---|
| Polyethyleneglycol 200 (Hoechst) | 200 |
| Urea | 250 |
| Sodium chloride | 100 |
| Ammonia | 1.65 |
| Ammonium chloride | 5 |
| Water | 443.35 |

All ingredients of the above formulations are calculated as 100% solids.

The glue formulations used were as follows:

|  | Blank g | Sample 1 g |
|---|---|---|
| Urea formaldehyde resin 65% (Molar ratio F:U = 1.7:1) | 3080 | 2772 |
| Hardener (ammonium chloride 15%) | 400 | 400 |
| Paraffin emulsion 50% | 210 | 210 |
| Formaldehyde binder | — | 308 |
| Water | 310 | 310 |
| Total | 4000 | 4000 |

Single layer boards were prepared in the laboratory by spraying each of these formulations onto 25 kg of wood chips. Boards were pressed at 8 sec/mm. The thickness of the boards was 17.3 mm. The temperature of the press was 200° C. and the pressure was 35 kg/cm$^2$. The dimensions of the boards produced were 40×56 cm.

The results obtained are reported in the following table:

|  | Blank | Sample 1 |
|---|---|---|
| Density (kg/m$^3$) | 710 | 700 |
| Bending strength (N/mm$^2$) | 19.6 | 19.0 |
| Internal bond strength (N/mm$^2$) | 0.76 | 0.75 |
| 2 hrs thickness swelling (%) | 6.2 | 7.8 |
| 24 hrs thickness swelling (%) | 15.4 | 17.5 |
| Free formaldehyde (mg/100 g of dry board) | 53.1 | 28.3 |
| % formaldehyde reduction | — | 46.7 |

This example proves that it is also possible to substantially reduce the free formaldehyde of resins that are rich in free formaldehyde while keeping all other properties at the same levels.

EXAMPLE 12

In the present example, a series of solutions are prepared as reported in table 1. The above mentioned solutions are used in the glue formulations as reported in table 2. Single layer boards are then prepared in the laboratory by spraying each of these formulations onto 25 kg wood chips. Boards are pressed at 10, 9 and 8 secs/mm. The thickness of the boards is 17.3 mms. The temperature of the press is 200° C. and the pressure is 35 kg/cm$^2$. The dimensions of the boards produced are 40×56 cms. The results obtained are reported in table 3 and are average values.

From the above mentioned table one notices a direct comparison in samples 2 to 9 between starch (the same type that is mentioned in U.S. Pat. No. 4,397,756), glycol, polyethylene glycol and dextrose. With starch it is not possible to obtain boards by adding the solution in the glue formulation, because the glue formulation gels within a few hours. Adding the formaldehyde binding solution to the glue formulation is one of the advantages claimed by our patent application. However, in sample 2a, starch and urea was added in situ. The boards produced show no synergism when compared to boards of sample 3 and 1 whereby in 1 only urea is added and in 3 only starch is added. Moreover sample 2a shows only a very low free formaldehyde reduction and a drop in the mechanical properties and water resistance as compared to the control, 0.

A comparison between sample 1, 4 and 5 proves that there is a synergistic behaviour when glycol is used with urea.

A comparison between sample 1, 6 and 7 proves that there is a synergistic behaviour when dextrose is used with urea.

A comparison between sample 1, 8 and 9 proves that there is a synergistic behaviour when polyethylene glycol is used with urea.

Samples 10, 11 and 12 show a synergistic behaviour when glycerins is used with thiourea. While all previous samples mentioned have a ratio of organohydroxy compound to amide of 72.2/100, sample 10 has a ratio of glycerine to thiourea of 351.4/100.

Samples 13, 14 and 15 show again the synergistic behaviour of dextrose, but instead of the ratio of 72.2/100 dextrose/urea) used in sample 6, in sample 14 the ratio dextrose/urea is 20.1/100.

TABLE 1

| Samples | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Starch (1) | — | 258 | 258 | — | — | — | — | — | — | — | — | — | — | — | — |
| Monoethylene glycol | — | — | — | 210 | 258 | — | — | — | — | — | — | — | — | — | — |
| Dextrose anhydrous | — | — | — | — | — | 210 | 258 | — | — | — | — | — | — | 95 | 103 |
| Polyethylene glycol (Peg 200 Hoechst) | — | — | — | — | — | — | — | 210 | 258 | — | — | — | — | — | — |

TABLE 1-continued

| Samples | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Glycerine | — | — | — | — | — | — | — | — | — | 390 | 438 | — | — | — | — |
| Methanol | — | — | — | 20 | — | 20 | — | 20 | — | 20 | — | — | — | — | — |
| Sodium chloride | — | — | — | 20 | — | 20 | — | 20 | — | 20 | — | — | — | — | — |
| Urea | 291 | 291 | — | 291 | — | 291 | — | 291 | — | — | — | — | 455 | 455 | — |
| Thiourea | — | — | — | — | — | — | — | — | — | 111 | — | 111 | — | — | — |
| Ammonia (calculated as 100%) | — | — | — | 2 | — | 2 | — | 2 | — | 2 | — | — | — | 2 | — |
| Ammonium chloride (100%) | — | — | — | 6 | — | 6 | — | 6 | — | 6 | — | — | — | 6 | — |
| Water | 709 | 451 | 742 | 451 | 742 | 451 | 742 | 451 | 742 | 451 | 562 | 869 | 545 | 442 | 897 |

(1) Cleargel A-51-6166, National Starch and Chemical Corp., Bridgewater, New Jersey, U.S.A.

TABLE 2

| Samples | Control 0 grams | 1 grams | 2 grams | 2a grams | 3 grams | 4 grams | 5 grams | 6 grams | 7 grams |
|---|---|---|---|---|---|---|---|---|---|
| Urea formaldehyde resin 65% (molar ratio F:U 1.7:1) | 3077 | 2769 | 2769 | 2769 | 2769 | 2769 | 2769 | 2769 | 2769 |
| Hardener (Ammonium chloride solution 15%) | 300 | 330 | 330 | 330 | 330 | 330 | 330 | 330 | 330 |
| Paraffin emulsion 50% | 250 | 250 | 250 | 250 | 250 | 250 | 250 | 250 | 250 |
| Ammonia 25% | 5 | 5 | 5 | 5 | 5 | 5 | 5 | 5 | 5 |
| Water | 368 | 338 | 338 | 338 | 338 | 338 | 338 | 338 | 338 |
| Sample 1 | — | 308 | | | | | | | |
| Sample 2 | — | — | 308 | 308 (1) | | | | | |
| Sample 3 | — | — | — | — | 308 | | | | |
| Sample 4 | — | — | — | — | — | 308 | | | |
| Sample 5 | — | — | — | — | — | — | 308 | | |
| Sample 6 | — | — | — | — | — | — | — | 308 | |
| Sample 7 | — | — | — | — | — | — | — | — | 308 |
| Sample 8 | — | — | — | — | — | — | — | — | — |
| Sample 9 | — | — | — | — | — | — | — | — | — |
| Sample 10 | — | — | — | — | — | — | — | — | — |
| Sample 11 | — | — | — | — | — | — | — | — | — |
| Sample 12 | — | — | — | — | — | — | — | — | — |
| Sample 13 | — | — | — | — | — | — | — | — | — |
| Sample 14 | — | — | — | — | — | — | — | — | — |
| Sample 15 | — | — | — | — | — | — | — | — | — |
| TOTAL | 4000 | 4000 | 4000 | 4000 | 4000 | 4000 | 4000 | 4000 | 4000 |

| Samples | 8 grams | 9 grams | 10 grams | 11 grams | 12 grams | 13 grams | 14 grams | 15 grams |
|---|---|---|---|---|---|---|---|---|
| Urea formaldehyde resin 65% (molar ratio F:U 1.7:1) | 2769 | 2769 | 2769 | 2769 | 2769 | 2769 | 2769 | 2769 |
| Hardener (Ammonium chloride solution 15%) | 330 | 330 | 330 | 330 | 330 | 330 | 330 | 330 |
| Paraffin emulsion 50% | 250 | 250 | 250 | 250 | 250 | 250 | 250 | 250 |
| Ammonia 25% | 5 | 5 | 5 | 5 | 5 | 5 | 5 | 5 |
| Water | 338 | 338 | 338 | 338 | 338 | 338 | 338 | 338 |
| Sample 1 | | | | | | | | |
| Sample 2 | | | | | | | | |
| Sample 3 | | | | | | | | |
| Sample 4 | | | | | | | | |
| Sample 5 | | | | | | | | |
| Sample 6 | | | | | | | | |
| Sample 7 | | | | | | | | |
| Sample 8 | 308 | | | | | | | |
| Sample 9 | — | 308 | | | | | | |
| Sample 10 | — | — | 308 | | | | | |
| Sample 11 | — | — | — | 308 | | | | |
| Sample 12 | — | — | — | — | 308 | | | |
| Sample 13 | — | — | — | — | — | 308 | | |
| Sample 14 | — | — | — | — | — | — | 308 | |
| Sample 15 | — | — | — | — | — | — | — | 308 |
| TOTAL | 4000 | 4000 | 4000 | 4000 | 4000 | 4000 | 4000 | 4000 |

(1) Single chemicals of sample 2 added separately in situ.

TABLE 3

| Sample | 0 | 1 | 2 | 2a | 3 | 4 | 5 | 6 | 7 |
|---|---|---|---|---|---|---|---|---|---|
| Density kg/m$^3$ | 710 | 700 | — | 690 | 680 | 690 | 700 | 700 | 680 |
| Tensile strength N/mm$^2$ | 1.08 | 0.94 | — | 0.90 | 0.89 | 1.07 | 1.00 | 1.08 | 0.99 |
| 2 hrs thickness swelling (%) | 12.6 | 12.9 | — | 14.1 | 14.9 | 13.7 | 11.4 | 11.5 | 11.7 |
| 24 hrs thickness swelling (%) | 21.9 | 24.1 | — | 24.3 | 26.7 | 23.9 | 21.1 | 22.1 | 21.0 |
| Free formaldehyde mg/100 gr dry board | 58.8 | 50.6 | — | 52.1 | 60.6 | 38.9 | 56.4 | 34.6 | 56.7 |

TABLE 3-continued

| % formaldehyde reduction | — | 14 | — | 11.4 | — | 33.8 | 4.1 | 41.2 | 3.6 |
| --- | --- | --- | --- | --- | --- | --- | --- | --- | --- |

| Sample | 8 | 9 | 10 | 11 | 12 | 13 | 14 | 15 |
| --- | --- | --- | --- | --- | --- | --- | --- | --- |
| Density kg/m$^3$ | 700 | 690 | 690 | 680 | 690 | 690 | 700 | 680 |
| Tensile strength N/mm$^2$ | 1.00 | 0.94 | 0.98 | 0.98 | 0.94 | 1.01 | 1.07 | 0.95 |
| 2 hrs thickness swelling (%) | 11.1 | 11.0 | 12.0 | 11.9 | 11.0 | 12.2 | 11.8 | 12.0 |
| 24 hrs thickness swelling (%) | 22.1 | 20.7 | 21.8 | 21.2 | 21.1 | 22.2 | 22.0 | 22.2 |
| Free formaldehyde mg/100 gr dry board | 40.7 | 55.7 | 48.3 | 58.6 | 54.1 | 41.2 | 32.4 | 57.7 |
| % formaldehyde reduction | 30.7 | 5.3 | 17.9 | 0.3 | 8 | 29.9 | 44.9 | 1.9 |

I claim:

1. A formaldehyde binder which comprises a solution of
   (a) at least one organic hydroxy compound selected from dihydric, trihydric and petahydric alcohols contaiing up to 20 carbon atoms, pentaerythritol, monosaccharides contaiing up to 6 carbon atoms, disaccharides containing up to 12 carbon atoms and mixtures thereof,
   (b) at least one amide selected from the group consisting of urea and thiourea wherein the ratio of component a to component b is 1:5 to 1:.25, and
   20 to 80% by weight of water.

2. The formaldehyde binder of claim 1 which further comprises (c) a C$_{1-4}$ aliphatic monohydric alcohol which acts as a solvent for (a) and (b) and also reacts with formaldehyde.

3. The formaldehyde binder of any one of claims 1 to 2 which, in addition, contains (d) a water-soluble halide salt.

4. The formaldehyde binder of claim 3 wherein (d) is a water-soluble halide of an alkali metal or an alkaline earth metal.

5. The formaldehyde binder of claim 1 wherein (d) is sodium chloride, potassium chloride or calcium chloride.

6. The formaldehyde binder of claim 4 wherein the ratio by weight of component (a) plus component (c) and (d), if present, to component (b) is 1:5 to 1:25.

7. The formaldehyde binder of claim 1 which comprises 20 to 80% by weight of the components a and b.

8. The formaldehyde binder of claim 1 which further comprises
   (e) a member selected from the group consisting of ammonia, ammonium carbonate, ammonium bicarbonate, ammonium sulfamate, ammonium acetate, ammonium carbamate, and a mixture thereof, and
   (f) a member selected from the group consisting of hydrochloric acid, ammonium chloride, sulfuric acid, ammonium sulfate, formic acid, ammonium formate, and a mixture thereof.

9. The formaldehyde binder of claim 8 wherein (e) is ammonium carbonate, ammonium bicarbonate, ammonium sulfamate, ammonium acetate or ammonium carbamate.

10. A process for preparing a formaldehyde binder comprising mixing, at a temperature from room temperature to 70° C.,
    (a) at least one organic hydroxy compound selected from dihydric, trihydric and pentahydric alcohols containing up to 20 carbon atoms, pentaerythritol, monosaccharides containing up to 6 carbon atoms, disaccharides containing up to 12 carbon atoms and mixtures thereof,
    (b) at least one amide selected from the group consisting of urea and thiourea wherein the ratio by weight of component (a) to component (b) is 1:5 to 1:25, and
    20 to 80% by weight of water.

11. A process as in claim 10 which further comprises adding (c) a C$_{1-4}$ aliphatic monohydric alcohol which acts as a solvent for (a) and (b) and also reacts with formaldehyde.

12. A process as in claim 10 which further comprises adding (d) a water-soluble halide salt.

13. A process for preparing boards from lignocellulosic materials using an adhesive based on formaldehyde wherein a formaldehyde binder according to claim 1 is added to the adhesive replacing an equivalent amount by weight of the adhesive.

14. A process as in claim 10 which further comprises adding
    (e) a member selected from the group consisting of ammonia, ammonium carbonate, ammonium bicarbonate, ammonium sulfamate, ammonium acetate, ammonium carbamate, and a mixture thereof, and
    (f) a member selected from the group consisting of hydrochloric acid, ammonium chloride, sulfuric acid, ammonium sulfate, formic acid, ammonium formate, and a mixture thereof.

15. A process as in any one of claims 10-12 wherein the ratio by weight of component (a) plus components (c) and (d), if present, to component (b) is 1:5 to 1:.25.

* * * * *

UNITED STATES PATENT AND TRADEMARK OFFICE
CERTIFICATE OF CORRECTION

PATENT NO. : 4,761,184
DATED : August 2, 1988
INVENTOR(S) : Efthalia V. MARKESSINI It is certified that error appears in the above-identified patent and that said Letters Patent is hereby corrected as shown below:

Column 1, line 26, change "sprayig" to --spraying--.

Column 2, line 23, change "ginving" to --giving--;

line 25, change "this" to --the--;

line 51, change "inventioneliminates" to --invention eliminates--;

line 65, change "ont" to --on--.

Column 4, line 17, change "nto" to --not--.

Column 10, line 4, change "baords" to --boards--.

Column 11, line 25, change "malemine" to --melamine--;

line 67, change "Formaldehyd" to --Formaldehyde--.

Column 15, line 14, change "mm" to --mg--;

line 22, change "contaiing" to --containing--.

Column 16, line 54, change "glycerins" to --glycerine--.

Columns 17-18, in TABLE 1-continued, the last row (beginning "Water"), under the column heading for Sample 12, change "869" to --889--;

UNITED STATES PATENT AND TRADEMARK OFFICE
CERTIFICATE OF CORRECTION

PATENT NO. : 4,761,184

DATED : August 2, 1988

INVENTOR(S) : Efthalia V. MARKESSINI

It is certified that error appears in the above-identified patent and that said Letters Patent is hereby corrected as shown below:

Columns 17-18, in TABLE 3, line 2 of the first column, after "Density", change "$kg/m^3$" to --$(kg/m^3)$--;

line 3 of the first column, after "Tensile strength", change "$N/mm^2$" to --$(N/mm^2)$--; and the last line of the first column change "mg/100 gr dry board" to --(mg/100 gr dry board)--.

Columns 19-20, in TABLE 3-continued, line 4 of the first column, after "Density", change "$kg/m^3$" to --$(kg/m^3)$--;

line 5 of the first column, after "Tensile strength" change "$N/mm^2$" to --$(N/mm^2)$--;

line 11, change "mg/100 gr dry board" to --(mg/100 gr dry board)--;

Claim 1, line 4, change "petahydric" to --pentahydric--;

line 5, change "contaiing" to --containing--;

UNITED STATES PATENT AND TRADEMARK OFFICE
CERTIFICATE OF CORRECTION

PATENT NO. : 4,761,184

DATED : August 2, 1988

INVENTOR(S) : Efthalia V. MARKESSINI

It is certified that error appears in the above-identified patent and that said Letters Patent is hereby corrected as shown below:

Claim 1 (continued), line 6, change "contaiing" to --containing--;

line 11, change "a" to --(a)--; change "b" to --(b)--;

Claim 7, line 2, change "a" to --(a)--; change "b" to --(b)--.

Signed and Sealed this

Eleventh Day of April, 1989

*Attest:*

DONALD J. QUIGG

*Attesting Officer*     *Commissioner of Patents and Trademarks*